Sept. 23, 1969 M. LATTMANN 3,469,081

TACHOMETRIC COMPUTER

Filed Aug. 19, 1964 8 Sheets-Sheet 1

Inventor
Max Lattmann
by Michael S. Striker
Attorney

Inventor
Max Lattmann
by Michael S. Striker
Attorney

Inventor
Max Lattmann
Attorney

Inventor
Max Lattmann
By Michael S. Striker
Attorney

Inventor
Max Lattmann
by Michael S. Striker
Attorney

Sept. 23, 1969 M. LATTMANN 3,469,081

TACHOMETRIC COMPUTER

Filed Aug. 19, 1964 8 Sheets-Sheet 6

Inventor
Max Lattmann
By Michael S. Striker
Attorney

TACHOMETRIC COMPUTER

Filed Aug. 19, 1964

Inventor
Max Lattmann
By Michael S. Striker
Attorney

Sept. 23, 1969 M. LATTMANN 3,469,081

TACHOMETRIC COMPUTER

Filed Aug. 19, 1964 8 Sheets-Sheet 8

Inventor
Max Lattmann
by Michael S. Striker
Attorney

United States Patent Office 3,469,081

Patented Sept. 23, 1969

3,469,081

TACHOMETRIC COMPUTER

Max Lattmann, Zurich, Switzerland, assignor to Contraves AG, Zurich, Switzerland Filed Aug. 19, 1964, Ser. No. 392,074
Claims priority, application Switzerland, Aug. 19, 1963, 10,194/63
Int. Cl. G06f 15/50; G06g 7/22, 7/78
U.S. Cl. 235—150.271 12 Claims

ABSTRACT OF THE DISCLOSURE

Two phase binary signals signifying a unit change of a physical value and the direction thereof by means of predetermined sequences of combinations of signals in said two phases, are connected directly to the first input of an increment signal adder and to the second input of the increment signal adder via a fixed delay and with reversed directional characteristic. The D.C. coupled adder has an output corresponding to the rate of change of the physical value, including direction. A feedback circuit including digital-analog conversion causes the shaft of a servomotor to follow the value at the output of the adder. An arrangement for using three of the above described circuits for predicting the position of an object in three dimensional space relative to a fixed origin on the basis of present velocity values in three coordinate directions is also furnished.

This invention concerns an apparatus for computing continuously data based on changes of a steadily variable physical value and of the direction thereof. An apparatus of this type is particularly useful for continuously producing a value which at any given moment corresponds to the algebraic sum of at least two variables both with respect to their positive or negative characteristic and at least to their respective magnitudes. However, the apparatus in question is also most useful for determining the velocity of occurring changes of at least one physical value and for computing data based on the velocity of such changes.

An extremely important field of application of the apparatus of question is the field of computing firing data and more specifically lead angles and other data needed for aiming at a free moving target in such a manner that a missile fired from a given reference point will meet the target at a computed interception point of the trajectory of the missile with the path of the target.

It is therefore one object of this invention to base apparatus of the above-mentioned type on the principle of continuous algebraic addition of increment signals corresponding in magnitude and in positive or negative characteristic to the magnitude and direction, respectively, of incremental changes of the respective physical value to be evaluated so that, by addition of these increment signals, integration of the increments over a given period of time is effected and yields a result which indicates the actual value of the particular physical value at the end of said period of time during which that change has taken place.

It is another object of this invention to provide apparatus of the above-mentioned kind which is more efficient and more reliable than similar apparatus or other apparatus that has been used for similar purposes in the past.

With above objects in view the invention includes an apparatus for computing continuously data based on changes of a steadily variable physical value and of the direction thereof, comprising, in combination, input means for introducing the steadily variable physical value; increment signal generator means operatively connected with said input means for receiving said physical value and being actuated thereby and responding to changes thereof in one or the other direction by producting at its output increment signals each of which represents an increment of predetermined fixed magnitude of a change of said physical value and has a directional characteristic which indicates the direction of such increment of change; delay means connected with said output of said increment signal generator means and delivering said increment signals as issued by the latter but with reversed directional characteristic and with a predetermined constant delay; increment signal adder means having one input connected with said output of said increment signal generator means for receiving said increment signals, and a second input connected with said delay means for receiving said increment signals with reversed directional characteristic and with said delay, said signal adder means producing by adding said different increment signals received at said two inputs secondary increment signals representing at any given moment the difference between said directly received increment signals and said increment signals with reversed directional characteristic and with said delay; and integrating means connected with said adder means for continuously algebracially summing up said secondary increment signals consecutively and storing the summation results so that at any given moment the stored result divided by the duration of said predetermined constant delay indicates the velocity at such given moment of a change taking place in said variable physical value and the direction thereof at such moment.

The invention also includes in an apparatus for computing continuously on the basis of the polar coordinates $r_m$, $\lambda_m$, $\alpha_m$ defining relative to a given reference point the momentary positions of an object moving along a given path in a given direction and on the basis of the velocity components thereof by extrapolation the polar coordinates of a point located along said path ahead of said object in said direction, in combination, first, second and third input means for introducing continuously the varying polar coordinates $r_m$, $\lambda_m$ and $\alpha_m$, respectively; first, second and third increment signal generator means operatively connected with said first, second and third input means, respectively, for receiving said coordinates and being actuated thereby, and each responding to changes of the respective coordinate in one or the other direction by producing at its output increment signals, each of which represents an increment of predetermined fixed magnitude of a change of the respective coordinate and has a directional characteristic which indicates the direction of such increment of change; first, second and third delay means connected with said output of said first, second and third increment signal generator means, respectively, each of said delay means delivering said increment signals as issued by the respective signal generator means but with reversed directional characteristic and with a predetermined constant delay; first, second and third increment signal adder means having each two inputs, one of said inputs being connected with said output of the respective signal generator means for receiving said increment signals issued thereby, the other input being connected with the respective delay means for receiving the respective increment signals issued thereby with said reversed directional characteristic and with said delay, each of said signal adder means producing by adding the respective signals received at said two inputs thereof secondary increment signals representing at any given moment the difference between the respective directly received increment signals and the respective delayed increment signals; and first, second and third integrating means connected with said first, second and third adder means, respectively, for continuously integrating the respective secondary increment signals and for storing the summation results, each of said integrating means comprising another increment signal adder means having a first and a second input and an output, said first input thereof being connected with the output of the respective one of said first, second and third adder means for receiving said secondary increment signals, and externally actuatable auxiliary increment signal generator means producing depending upon its actuation tertiary increment signals and delivering the latter to said other increment signal adder means of the respective integrating means, servo-motor means having a drive shaft for actuating the respective auxiliary increment signal generator means, said other increment signal adder means producing differential increment signals by adding said secondary increment signals applied thereto to the reversed values of said tertiary increment signals applied thereto, and signal counting and storing means connected with said output of the respective other increment signal adder means for storing the sum of said differential increment signals and for causing delivery of a corresponding energizing voltage to the respective servomotor means so as to cause turning of said drive shaft thereof accordingly, said energizing voltage corresponding at any given moment in magnitude and polarity to said sum of said differential signals stored at such moment in the respective signal counting and storing means, so that at any given moment the angular position of the individaul drive shafts of said servomotor means in said first, second and third integrating means, respectively, corresponds with great accuracy to, and indicates, a change of said polar coordinates $r_m$, $\lambda_m$, $\alpha_m$, respectively, that has occurred during said predetermined constant delay period preceding such given moment.

In still another aspect of the invention it includes in a lead point predicter apparatus for computing continuously on the basis of the polar coordinates $r_m$, $\lambda_m$, $\alpha_m$ defining relative to a given reference point the momentary positions of a target moving along a given path in forward direction and on the basis of the velocity components thereof by extrapolation the polar coordinates of an interception point located along said path ahead of said target in said direction, in combination, first, second and third computer means responding individually to continuous introduction of physical values representing said continuously varying polar coordinates $r_m$, $\lambda_m$, $\alpha_m$, respectively, by forming, respectively, continuously varying difference values $$\Delta r_v = r_m - r_v$$
$$\Delta\lambda_v = \lambda_m - \lambda_v$$
$$\Delta\alpha_v = \alpha_m - \alpha_v$$

said difference values representing at any given moment changes of said polar coordinates, respectively, that have occurred during a predetermined constant period of time T preceding said moment $t_0$ at which said coordinates have the values $r_m$, $\lambda_m$, $\alpha_m$, respectively, said coordinates having at the start of said period of time T the values $r_v$, $\lambda_v$, $\alpha_v$, respectively, defining a preceding position along said path where said target was located at the moment $t_0$—T; travel computer means cooperating with said first, second and third computer means for computing from said difference values the horizontal and vertical first rectangular components of the travel of said target carried out during said time period T; multiplier means cooperating with said travel computer means for computing by linear extrapolation from said first rectangular components the corresponding second rectangular components of the assumed travel of said target along said path from said momentary postition thereof at said moment $t_0$ to said point of interception with a missile to be reached after a missile flight time $\theta$; and lead computer means cooperating with said multiplier means for computing on the basis of said second rectangular components and of said missile flight time $\theta$ the lead values applying to the particular path and velocity of said target and to the required missile flight time required for intercepting said target.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 11:
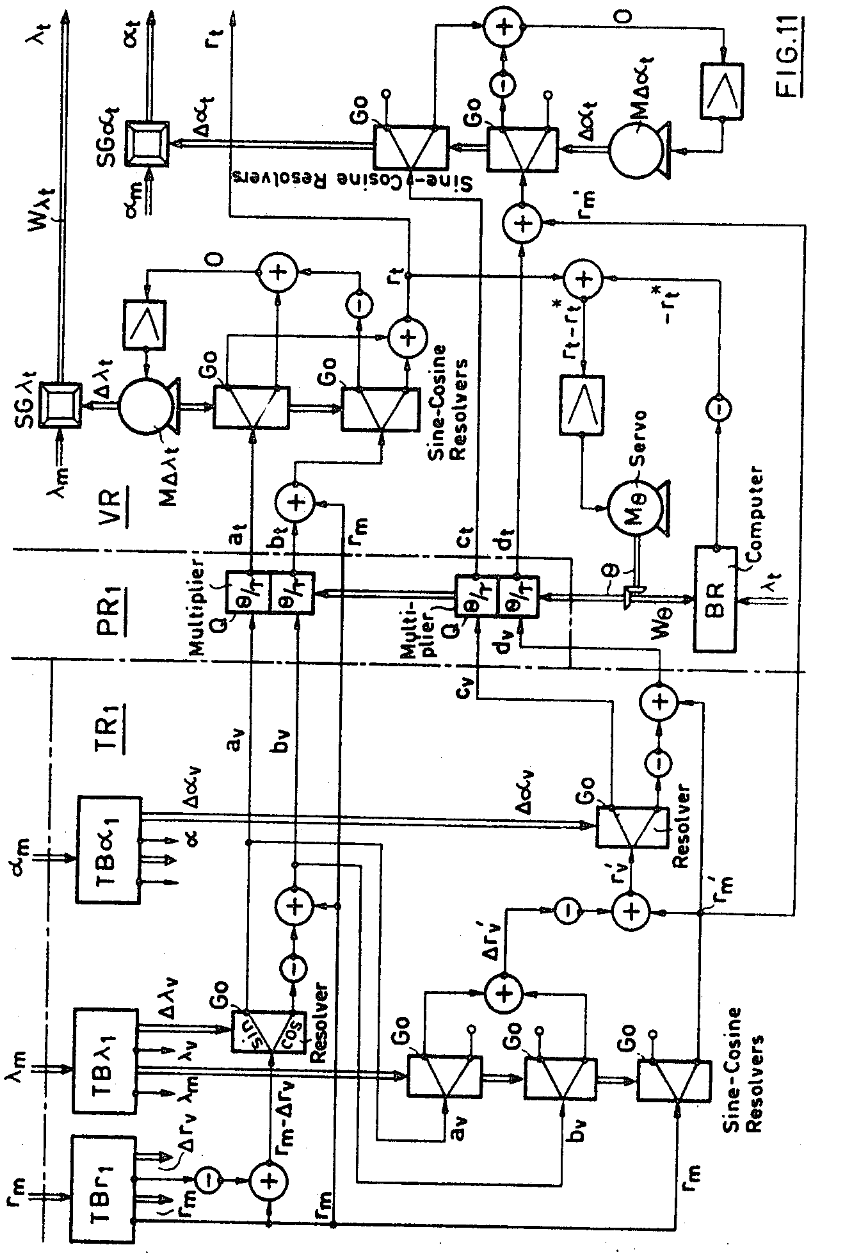
Figure 12:
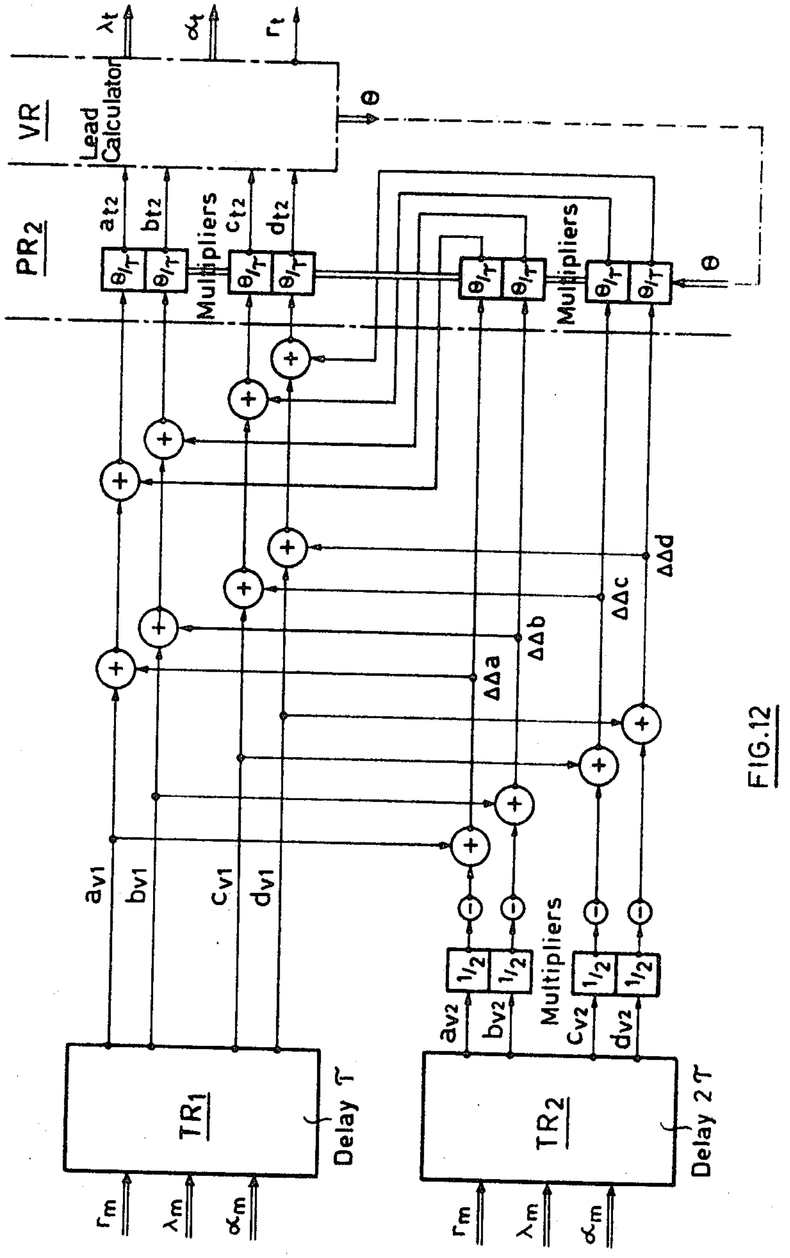

FIG. 11 is a schematic diagram of a more elaborate apparatus according to the invention suitable for being used as a lead point predicter and based on linear extrapolation of the polar coordinates of the intersection of the missile trajectory with the path of the target; and FIG. 12 is a similar schematic diagram of an apparatus similar to that of FIG. 11 except that it is based on the use of square extrapolation of said coordinates.

Figure 2:
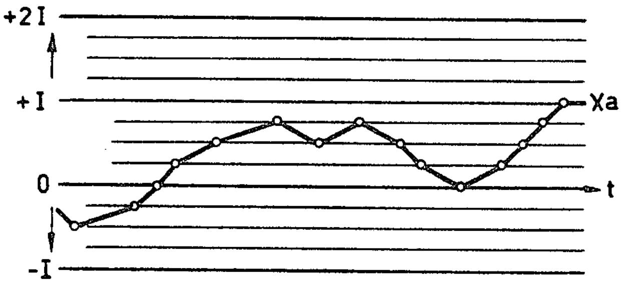
FIG. 2 is a diagram illustrating by way of example a sequence of changes of the value X*a*.
Figure 1:
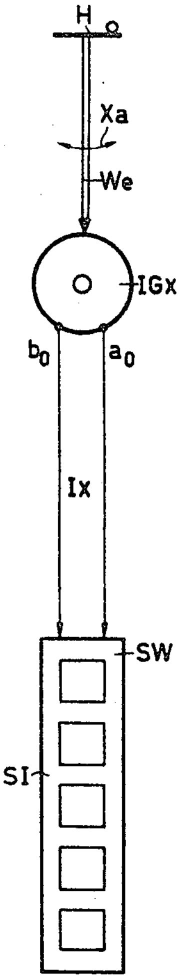
FIG. 1 Prior Art
FIG. 1 is a diagrammatic illustration of an apparatus for digital indication of changes of a continuously varying input value X*a* e.g. the angular position of a rotary shaft W*e*.

In accordance with FIG. 1 the input shaft W*e* of a two-phase increment signal generator IG*x* of conventional type is continuously turned depending upon an input value X*a* which varies with time, e.g. in accordance with the variations of the angular orientation of the shaft W*e*. The rotation of the shaft may be produced by a handwheel H or by some other transmitter apparatus of some desired kind in such a manner that at any given moment the angular orientation of the shaft relative to a given reference direction corresponds at least approximately to the input value X*a* which is being introduced and whose variations with time $t$ are illustrated by way of example by the diagram of FIG. 2. In the diagram FIG. 2 the ordinates I illustrate the magnitude of the changes of the input value X*a* or in other words the increments in positive or negative direction of these changes. The heavy horizontal lines of FIG. 2 are spaced a distance which corresponds to a chosen unit magnitude of such increments but is subdivided by thin lines into subdivisions which corresponds to respective fractions of said units of increments. In the present example the unit of increment I may be considered to be a full revolution of the shaft W*e* while the subdivisions of this unit of increment would correspond to a corresponding fraction of a complete revolution.

The conventional increment signal generator IG$x$ produces in its output lines $A_0$ and $B_0$ in response to the rotation of the shaft W$e$ i.e., in response to every incremental change of the input value X$a$ a predetermined sequence of different combinations of binary conditions. As is well known these conditions may be represented by zero potential or a predetermined particular potential in a particular line. Consequently, with two lines available for different binary conditions, there are four different binary conditions possible, each condition being a combination of the conditions in the two output lines $a_0$ and $b_0$ as indicated herebelow, the first mentioned condition mentioned in each combination concerning the line $a_0$ and the second one concerning the line $b_0$:

Condition:

| | |
|---|---|
| $K_0$ | 0, 0 |
| $K_1$ | 0, L |
| $K_2$ | L, L |
| $K_3$ | L, 0 |

Condition $K_4$ will of course be identical with the above-mentioned condition $K_0$.

Figure 3:
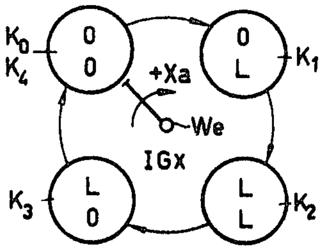
FIG. 3 is another diagram illustrating the operation of an increment signal generator IG*x* forming part of the apparatus according to FIG. 1.

In FIG. 3 the above-mentioned sequence of different binary conditions generated by the generator IG$x$ on account of rotation of the shaft W$e$ in clockwise rotation is illustrated diagrammatically by showing the above-mentioned changes of conditions along a circle concentric with the shaft W$e$. In each of the condition representing circles the upper character indicates the condition in line $a_0$ while the lower symbol indicates the condition in the other output line $b_0$. It may be assumed that the symbol 0 means that there is no potential in the particular line while the symbol L would mean that there is a certain voltage or current of predetermined amplitude available in the particular line.

It can be seen from FIG. 3 that each change from one binary condition to another one is characterized by the fact that with each step only one of the two conditions in a pair of lines $a_0$ and $b_0$ changes. As a consequence, from the change from one pair of conditions to the other one it can be determined automatically also in which direction the change has taken place. For instance, a change from the condition 0, 0 to 0, L cannot take place anywhere except in accordance with a clockwise or positive change of the value X$a$. On the other hand the change from the condition 0, 0 to L, 0 can only occur anywhere in accordance with a counterclockwise or negative change of the value X$a$. Accordingly, each change step from one of the conditions illustrated in FIG. 3 to the next following one anywhere in the cycle corresponds to a change or increment of the input value X$a$ in the amount of one-quarter of the unit I. In the example discussed above this unit I corresponds to a full revolution of the shaft W$e$. Of course this is only one possible assumption and conditions may be chosen differently whenever required.

Figure 4:
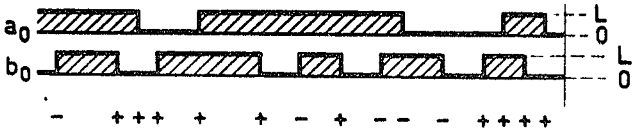
FIG. 4 illustrates diagrammatically by way of example a sequence of increment signals as they would appear on the output lines of the increment signal generator of FIG. 1.

The time diagram of FIG. 4 is intended to illustrated by way of example a series or sequence of changes of the binary conditions in the output line $a_0$ and $b_0$, the variations changing irregularly as far as duration and direction is concerned as is indicated in the diagram also by the positive and negative signs below the diagram. It should be noted that in this manner variations of the value X$a$ can be indicated even if these variations occur within one-quarter of the unit value I.

Increment signal generators of the type which operates as described above are well known in the art. For instance, the firm Johannes Heidenhain of Traunreut uber Traunstein, Obb., Germany has produced and marketed a mechanical optical, electrical increment signal generator which carries the type name ROD and operates for handling rotary increments of the input shaft defined by the occurrence of 10,000 incremental units per revolution.

Figure 5:
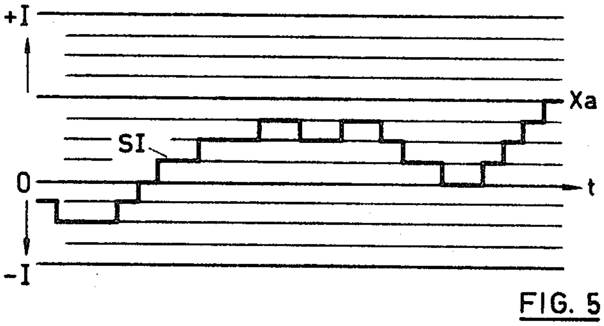
FIG. 5 is still another diagram illustrating how the storage content of a storage and counting arrangement SW of FIG. 1 would change during operation so as to indicate at any time the value X*a*.

According to FIG. 1 the individual increment signals I$x$ appearing on the output lines $a_0$ and $b_0$ of the increment signal generator IG$x$ are applied to a conventional digital storage and counting arrangement SW so that the storage content thereof SI changes with time as is illustrated by FIG. 5. In this diagram the stepped curve SI illustrates these changes of the storage content of the storage device SW which actually operates as an inegrating adder of positive and negative increments as illustrated by FIGS. 2 and 4. Thus at any given moment the magnitude of the input value X$a$ at a given moment relative to some suitable reference is illustrated by the shape of the line SI and can be read out from the storage device SW.

Figure 6:
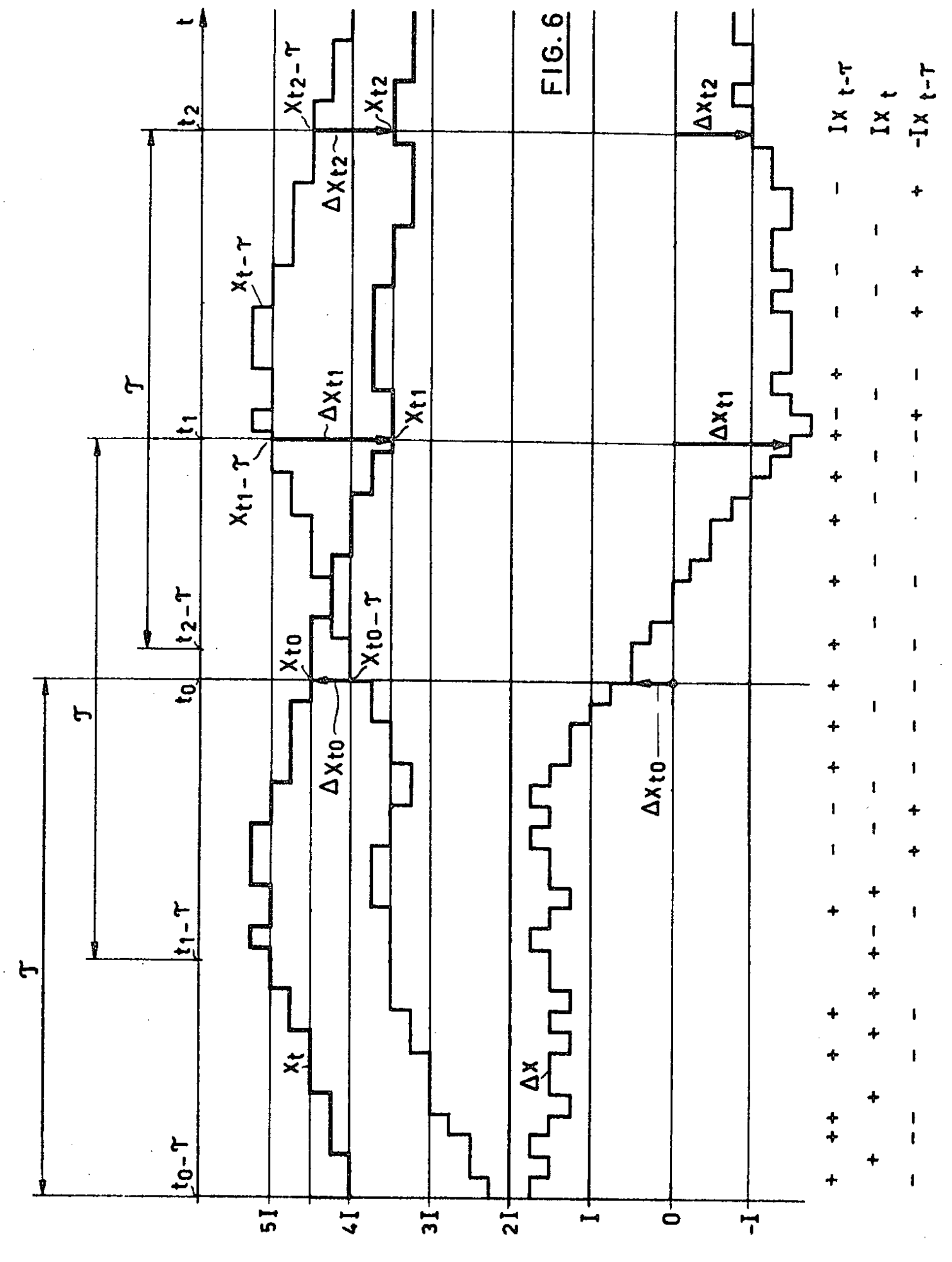
FIG. 6 is a diagram illustrating the operation of an increment adder arrangement particularly of the type illustrated by FIG. 7.
Figure 7:
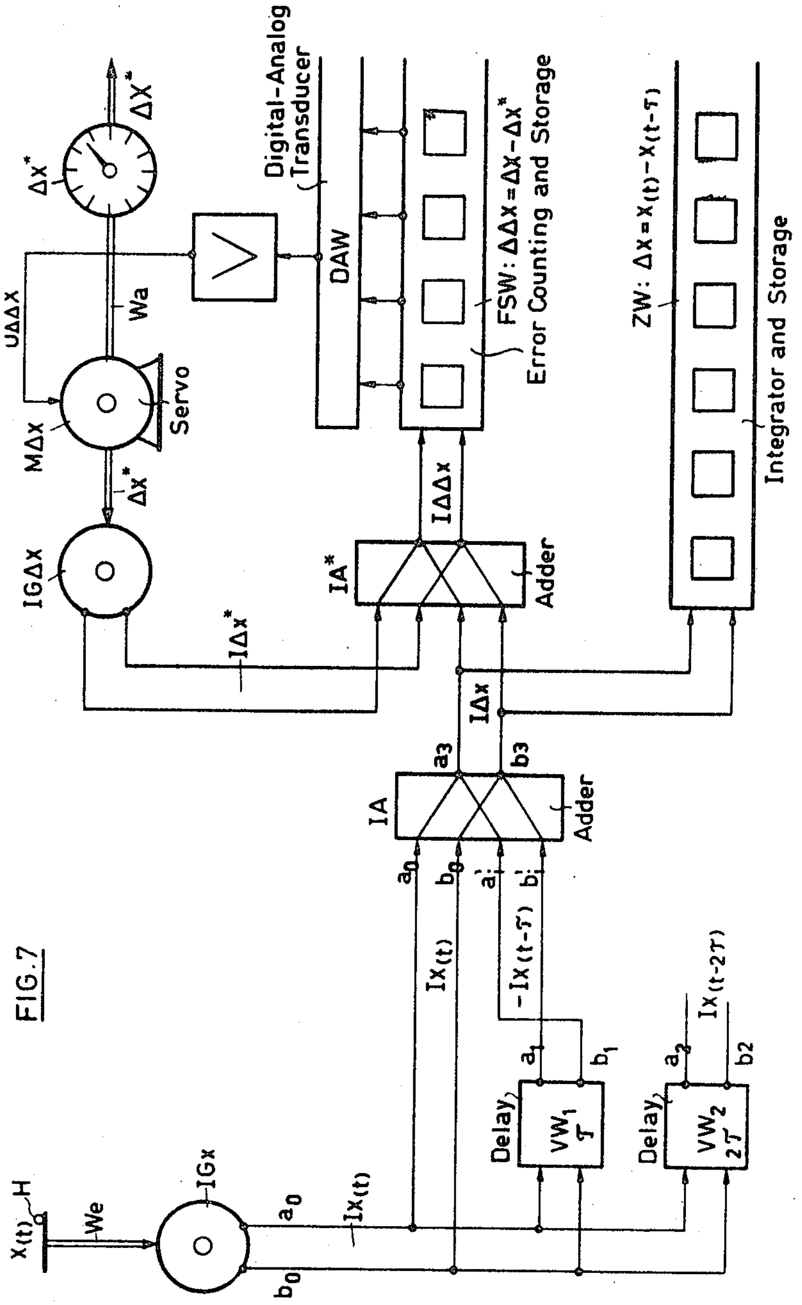
FIG. 7 is a schematic diagram illustrating an apparatus according to the invention for producing a signal or indication of the velocity of the change of an input value $x(t)$ at any given moment.

In the diagram of FIG. 6 which actually illustrates the operation of at least a portion of an arrangement illustrated by FIG. 7, the stepped curve marked $X_t$ illustrates the changes with time of an input value $x=f(t)$ in quantized form, it being understood that only the quants of the magnitude of the unit I as indicated a the lefthand of the diagram having values—I, 0, I, 2, I, etc. are counted while each unit is subdivided into four partial values or fractions which may correspond to the quarters of revolution illustrated by and referred to in FIGS. 2 and 4. However, it is of great importance and characteristic of the invenion to note that the second stepped curve marked $X_{t-\tau}$ is an exact duplicate of the first stepped curve marked $X_t$ except that the second curve is shifted in the direction of the time abscissa .$t$ a constant fixed amount which corresponds to a delay of the value $\tau$ which may amount to 1 to 2 seconds. A third stepped curve is marked $\Delta x$ which everywhere represents at the scale of the diagram the difference between the first and second stepped curves or the respective ordinate values thereof or in other words illustrates the difference value $x_t—x_t—_\tau$.

It will be shown further below how the difference between the variations of the input value and the same but delayed value will be used most advantageously for the intended and desired computations.

Below the diagram of FIG. 6 there are three lines of positive and negative signs which refer to the above discussed stepped curves and indicate in horizontal direction whether in the respectively associated stepped curve a positive or negative change occurs at the respective time $t$. The first line of positive and negative signs is associated with the second stepped curve while the second line of the positive and negative signs is associated with the first stepped curve. The third line of positive and negative signs is closely related to the first line thereof except that the positive and negative signs are reversed relative to each other. Thus it can be seen that the addition of the positive or negative values of the stepped curve $X_t$ and of the reversed values of the curve $X_{t-\tau}$ in a continuously integrating manner is bound to lead to a sum of increment signals represented by $I\Delta x=Ix_t—Ix_{t-\tau}$ which in accordance with the above explanation will be found as being stored in the storage and counting arrangement ZW.

It can be seen readily that the actual value of the ordinates of the stepped curve marked $\Delta x$ in FIG. 6 will correspond at any given moment to the amount of change which the input value $x_t$ has undergone during the period of time $\tau$ ending at such given moment and being characterized by the above-mentioned shift between the first and second stepped curves of FIG. 6, i.e. between a directly received input signal and delayed input signal, said change being correctly indicated both with respect to its magnitude and to its direction.

For the purpose of explanation in FIG. 6 three arbitrarily chosen moments $t_0$, $t_1$ and $t_2$ are marked along the line indicating time $t$. Now it can be seen easily that for instance the ordinate of the second stepped curve at the moment $t_0$ is exactly the same as the ordinate of the first stepped curve at the moment $t_0—\tau$. Similarly, the ordinate of the second stepped curve at the moment $t_1$ is exactly the same as that of the first stepped curve at the moment $t_1—\tau$. The same applies to the moment $t_2$. Accordingly FIG. 6 also shows the respective difference values $\Delta x_t$.

For additively combining two-phase increment signals of two different increment signal generators feeding their signals into one common output line increment adders IA may be used as illustrated in FIG. 7. Without describing the details of that arrangement which will be done further below it may be mentioned at this point that the increment signal generator IG$x$ delivers its signals into a first pair of output lines $a_0$ and $b_0$ which are taken directly to an increment adder IA. The same increment signals are delivered after passing through a delay device i.e. with a delay in the amount of a period through another pair of input lines $a_1$ and $b_1$ to the other two inputs of the adder IA so that the resulting sum of the two signals will be delivered at the outputs $a_3$ and $b_3$.

The operation of this increment adder of conventional type is best illustrated by the following chart:

Possible Signals at 1rst inputs of IA (− ← → +)

| Lines $a_0$ $b_0$ $A_0$ $B_0$ / Lines $a_1$ $b_1$ $A_1$ $B_1$ | 00 | OL | LL | LO | 00 |
|---|---|---|---|---|---|
| 00 | 00 | OL | LL | LO | 00 |
| OL | OL | LL | LO | 00 | OL |
| LL | LL | LO | 00 | OL | LL |
| LO | LO | 00 | OL | LL | LO |
| 00 | 00 | OL | LL | LO | 00 |

Possible Signals at 2nd inputs of IA (− ↑ ↓ +)

Resulting Signals at outputs $a_3b_3$

In the above chart or diagram the top line or row represents the possible signal combination which may reach the adder IA directly through the lines $a_0$ and $b_0$ at its first two inputs. The first column at the left represents those signals which may reach the second inputs of the adder IA through the other input lines $a_1$ and $b_1$. The remainder of the chart illustrates in a matrix type manner which resulting addition signals will appear at the output $a_3$ and $b_3$ depending upon which combination of signals appear simultaneously at the two pairs of inputs of the adder IA. In order to fully understand this chart the following should be considered. Assuming that on one pair of input lines $a_0$, $b_0$ of the adder a particular one of the input signals marked in the top horizontal line remains unchanged while in the other input lines $a_1$, $b_1$ signals change in one or the other direction along the vertical column at the far left of the diagram then it can be seen that at the outputs $a_3$, $b_3$ the signals would change in the same manner as at the inputs $a_1$ and $b_1$. In a similar manner, if it is assumed that a particular one of the signal combinations at the input lines $a_1$, $b_1$ remains unchanged while the signals change at the other input lines $a_0$, $b_0$ then it can be seen that also in this case the signals at the output $a_3$, $b_3$ will change in the same manner as the changing signals at the input $a_0$, $b_0$.

From this it should be concluded that, since the two-phase signals on the input lines each represent an increment of predetermined magnitude and direction, the output signals furnished by the increment adder IA also will represent increment signals of predetermined magnitude and corresponding in their positive or negative characteristic to the result of the addition of positive or negative increments represented by the input signals.

Assuming that the conditions at the two pairs of inputs of the increment adder are designated as $A_1$, $B_1$ and $A_2$, $B_2$, respectively, and that similarly the conditions appearing at the pair of output terminals are designated as $A_3$, $B_3$, then the logical circuit arrangement within the increment adder would have to follow e.g. the following conditions in terms of Boolean algebra:

$$A_3=\overline{A}_1\overline{B}_1A_2+\overline{A}_1B_1B_2+A_1B_1\overline{A}_1+A_1\overline{B}_1\overline{B}_2$$
$$B_3=\overline{A}_1\overline{B}_1B_2+\overline{A}_1B_1\overline{A}_2+A_1B_1\overline{B}_2+A_1\overline{B}_1A_1$$

A similar expression of this condition would be the following:

$$A_3=A_1\overline{A}_2\overline{B}_2+B_1\overline{A}_2B_2+\overline{A}_1A_2B_2+\overline{B}_1A_2\overline{B}_2$$

$$B_3=B_1\overline{A}_2\overline{B}_2+\overline{A}_1\overline{A}_2B_2+\overline{B}_1A_2B_2+A_1A_2\overline{B}_2$$

As is well known such conditions of logical circuits can be realized in conventional manner by means of relay circuits or also of diode gate circuits. As a matter of fact, increment adders of this type are the exact counterpart as far as their function is concerned of a mechanical differential gear arrangement having two input shafts the rotary movements of these two shafts being combined additively or subtractively in the rotation of an output shaft of that arrangement.

Referring now to FIG. 7 it will be understood that a rotary movement or change of angular position or orientation of the input shaft W$e$ whose position at any given moment corresponds to the value of a variable input value $x(t)$ at such given moment serves to adjust accordingly a two-phase increment signal generator IG$x$ the function of which has been described already above in reference to FIGS. 1, 3 and 4. The increment signals $Ix_{(t)}$ are directly applied to one of the pairs of inputs $a_0$, $b_0$ of an increment adder IA but are simultaneously also applied to the inputs of a conventional delay device $VW_1$. This delay device has the function of receiving and storing the increment signals applied thereto through a predetermined constant and preferably adjustable time period $\tau$, e.g. for a period of 1 to 2 seconds, and will deliver after the termination of this delay period the received signals otherwise unchanged to two output lines $a_1$ and $b_1$. For instance, the device $VW_1$ may comprise a signal carrier or recorder having two tracks, e.g. a magnetizable tape in a tape recorder operating with two tracks, the tape being moved wtih constant speed from the respective recording device to the corresponding read-out device whereafter the tape would return via an eraser device to the recording device. However, also purely electrical signal delay devices are well known in the art. In any case, at the output of the delay device $VW_1$ the increment signals $Ix_{(t-\tau)}$ which correspond to the incrementally changing values of the input value $x(t)$ at given moments $t$ which are however delivered now at the end of the delay period, i.e. at the moment $t-\tau$. In order to reverse positive and negative values or increments a phase change is effected by crossing the output line $a_1$, $b_1$ of the delay device $VW_1$ so as to arrive as lines $a_1'$, $b_1'$ at the second inputs of the increment adder IA as is shown in FIG. 7, so that in this manner in accordance to FIG. 3 the positive values and negative values of the increment signals $Ix_{(t-\tau)}$ are converted to the respective negative and positive values thereof. The increment signals after said delay and polarity reversal are hereinafter referred to as delayed increment signals.

As a consequence, at the output $a_3$, $b_3$ of the increment adder IA increments $I\Delta x=Ix(t)+(Ix_{(t-\tau)})$, i.e. the increment adder IA operates as a source of two-phase increment signals exactly like the increment signal generator IG$x$ furnishes this type of signals.

By algebraic addition or integration of these increment signals I$\Delta x$ in a counting and storing arrangement of conventional type ZW the value of this signal may be indicated in digital form, e.g. as a decimal number. The varying storage content $\Delta x$ of the counting and storing device ZW will therefore correspond to the third stepped curve in FIG. 6 as discussed above.

Indirectly this signal or value represents velocity because at any given moment the value $\Delta x$ represents in magnitude and positive or negative characteristic the change which the input value $x_t$ has undergone during the delay period of constant duration $\tau$ which terminates at such given moment. Consequently, the velocity of the change $Vx_{(t)}$ of the value $x_t$ at the moment $t$ would logically correspond to the value $\Delta x/\tau$.

The counting and storing arrangement ZW, one embodiment of integrating means, may be of any conventional suitable type the only condition being that it is capable of counting forward and backward so that an algebraic addition of the input signals is possible no matter whether they have positive or negative characteristics. If desired a digital-analog converter of known type may be combined with the counter ZW so that in this manner the digital stored content of the device ZW is converted also into an analog value corresponding to the value $\Delta x$ provided that such an analog value is needed or desired for controlling a servomotor.

An additional possibility of integrating the increment signals $I\Delta x$ appearing at the outputs $a_3$ and $b_3$ of the increment adder IA is also illustrated in FIG. 7.

A servomotor $M\Delta x$ is provided for driving an output shaft $Wa$ which drives in one or the opposite direction an increment signal generator $IG\Delta x$ which in its construction and operation is quite similar or rather identical with the above described increment signal generator $IGx$. At any given moment the output shaft $Wa$ has a certain angular position or orientation relative to some reference position, the position at such given moment being expressed by $\Delta x^*$ is intended to correspond to the change of the input value during the above-mentioned delay period, i.e. to the value to be computed and defined by $\Delta x=x(t)-x(t-\tau)$. Consequently at the outputs of the increment signal generator IG increment signals $I\Delta x^*$ will appear which after reversal of their original positive or negative characteristic are introduced to the one pair of inputs of a second increment adder IA*. The second pair of inputs of this second increment adder is connected directly with the above-mentioned output terminals $a_3$ and $b_3$ of the first adder IA.

Consequently at the outputs of the second increment adder IA* increment signals will appear which are defined as $I\Delta\Delta x=I\Delta x-I\Delta x^*$ and these increment signals are introduced into an error counting and storing device FSW wherein they are counted or added taking into consideration their positive or negative characteristics. The storage content of the error storage device FSW which is otherwise constructed and functions in a manner similar to that of the above-mentioned counting and storage arrangement ZW has therefore at any given moment the value $\Delta\Delta x=\Delta x-\Delta x^*$. The outputs of the error storage device FSW are connected with a conventional digital-analog transducer DAW, which is capable of converting the signals issued by FSW into an analog control voltage $U\Delta\Delta x$ for the servomotor $M\Delta x$ to which this control voltage is applied via an amplifier. Now it will be understood that the servomotor $M\Delta x$ is capable of adjusting the orientation or angular position of its output shaft $Wa$ always in such a manner that the content $\Delta\Delta x$ of the error storage device FSW is reduced toward the value zero. The effect of this is that the angular position or orientation $\Delta x^*$ of the shaft $Wa$ at any given moment always corresponds at least approximately to the amount of change $\Delta x$ of the input value $x(t)$ that has taken place during said delay period $\tau$ ending at such given moment. Hereby the possible fluctuations of the value $\Delta x$ are smoothened with a small time constant, i.e. transitory disturbances or fluctuations of the input value $x(t)$ are more or less eliminated. Such disturbances could have any effect on the smoothened velocity value $\Delta x^*$ at most during the predetermined and constant delay period $\tau$. In this respect the arrangement according to FIG. 7 is very much more advantageous than known conventional tachometers or velocity measuring devices in which the determined or found velocity values are smoothened by means of an RC-filter or other smoothing devices operating with an exponential characteristic.

Since the time period $\tau$ on which the above-mentioned change $\Delta x^*$ of the input value is based is predetermined and well known and also constant, the above-described tachometer arrangement according to FIG. 7 is particularly well suited for being used in connection with extrapolation calculators by means of which a future change of an input value can be predicted by means of multiplication of the established change velocity $\Delta x/\tau$ at a given moment with a time factor such as is customarily being done in apparatus for the fire control of antiaircraft artillery for the purpose of predicting the intersection point between the trajectory of a missile and the path of a moving target.

In case that the arrangement above described is further supplemented by a second delay device $VW_2$ for applying to the input increment signal $Ix_{(t)}$ a delay of the magnitude $2\tau$, then the thus produced increment signals $Ix_{(t-2\tau)}$ can be treated in the same manner as described above for the signals $Ix_{(t-\tau)}$ on the basis of a delay time $\tau$. In this manner it is possible to carry out a square extrapolation of the input value $x_t$. As a matter of fact, by means of a plurality of delay devices $VW_i$ producing different delay periods $Ti$ and by using corresponding increment adders and storage and counting devices so-called transversal filters operating on the basis of time domain synthesis can be constructed which are capable of producing an output signal $Y_t$ in accordance with the following equation $$Y(t)=\sum_{i=1}^{n} k_i \cdot X(t-T_i)$$

Inasmuch as arrangements of the general type represented by this invention can be utilized advantageously as trigonometric lead point predicters it should be understood that trigonometric lead point predicters are generally known, e.g. by the Swiss Patent No. 302,582.

However, a serious disadvantage of these known lead point predicters is characterized by the fact that up to now no means have been known for forming with sufficient accuracy the target velocity vector existing at a given moment. Up to now it has been attempted to cause a surveying or observation instrument to furnish continuously the polar coordinates $(\alpha_m, \lambda_m, \gamma_m)$ of a target point at a given moment (M) in relation to a reference point constituted by the position of the surveying instrument and to compute on the basis of these polar coordinates the Cartesian coordinates $x_m y_m z_m$ of the above-mentioned target point in a Cartesian coordinate system having a point of origin identical with that of said polar coordinates. It was then customary to introduce the Cartesian coordinates of said target point into a device capable of differentiating these coordinates with respect to time and to form in this manner Cartesian velocity components $$\dot{x}=\frac{dx}{dt}; \dot{y}=\frac{dy}{dt}$$

and $$\dot{z}=\frac{dz}{dt}$$

By means of suitable smoothening devices these velocity components were smoothened. However, this conventional method never yielded sufficiently accurate velocity components. This is due to the fact that unavoidable error existing at a given moment in the polar coordinates found by the surveying instrument are capable of extending their effect upon the received results over unpredictable long periods of time. However, a correct extrapolation of the interception point between missile trajectory and path of the moving target must be based on knowing the duration of those periods of time on which the mean value of the computed velocity components has been based.

Therefore the present invention makes use of the velocity determining arrangement of the type described further above which makes it possible to produce continuously difference values $\Delta x_v = x(t)_0 - x(t_0 - \tau)$ which is the difference between the value $x(t_0)$ at a given moment of an input value $x(t)$ freely variable with time and an input value $x(t_0 - \tau)$ existing at a moment $(t_0 - \tau)$ which precedes said given moment $t_0$ by a constant and predetermined and thus accurately known time difference $\tau$.

By using the above-mentioned velocity determining devices an undesirable or detrimental effect of substantial transistory errors in the magnitude of the input value extending over an undetermined period is safely avoided and a basis is found for an accurate extrapolation of that value of a given input value which is valid and correct for a predetermined extrapolation period of time.

Additional improvements of this basic arrangement according to the invention may consist in using square instead of linear extrapolation of the coordinates of the above-mentioned interception point, and also in a very substantial simplification of the required computing devices because it will be shown that it is possible to eliminate entirely the necessity of determining the Cartesian components of the target velocity vector.

Figure 8:
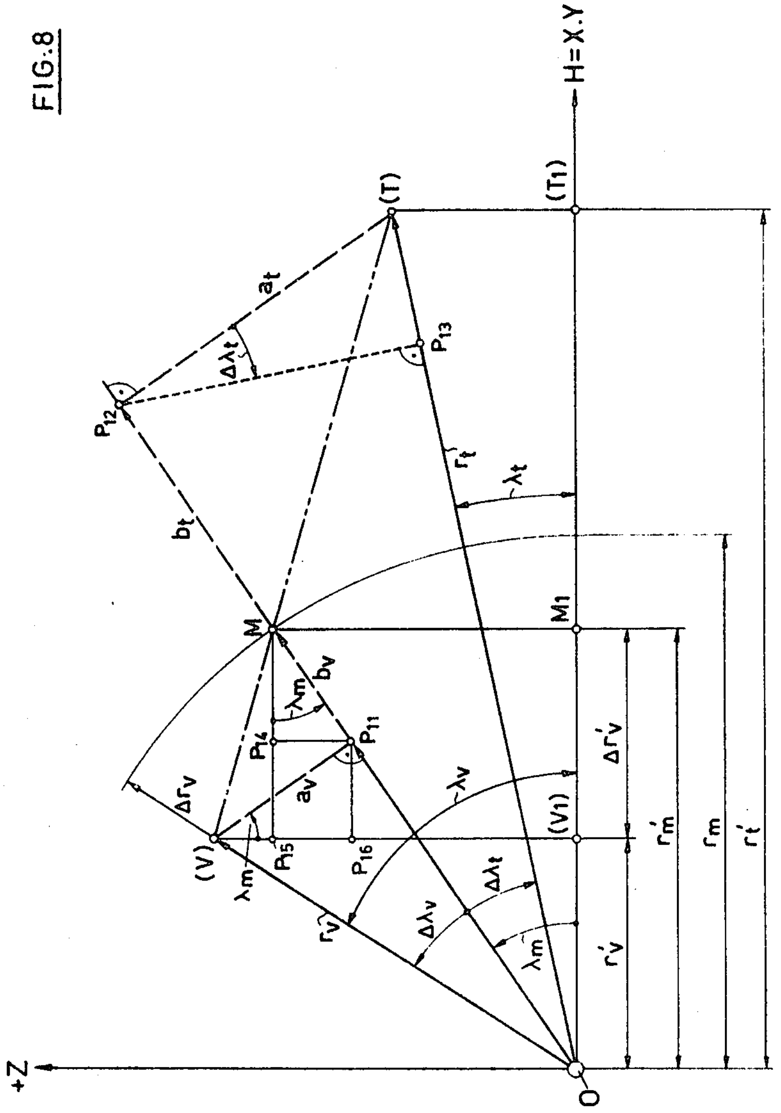
FIG. 8 illustrates the geometrical relations between the coordinates of a moving target in relation to a reference point as they appear in a vertical plane through the reference point and the location of the target.
Figure 9:
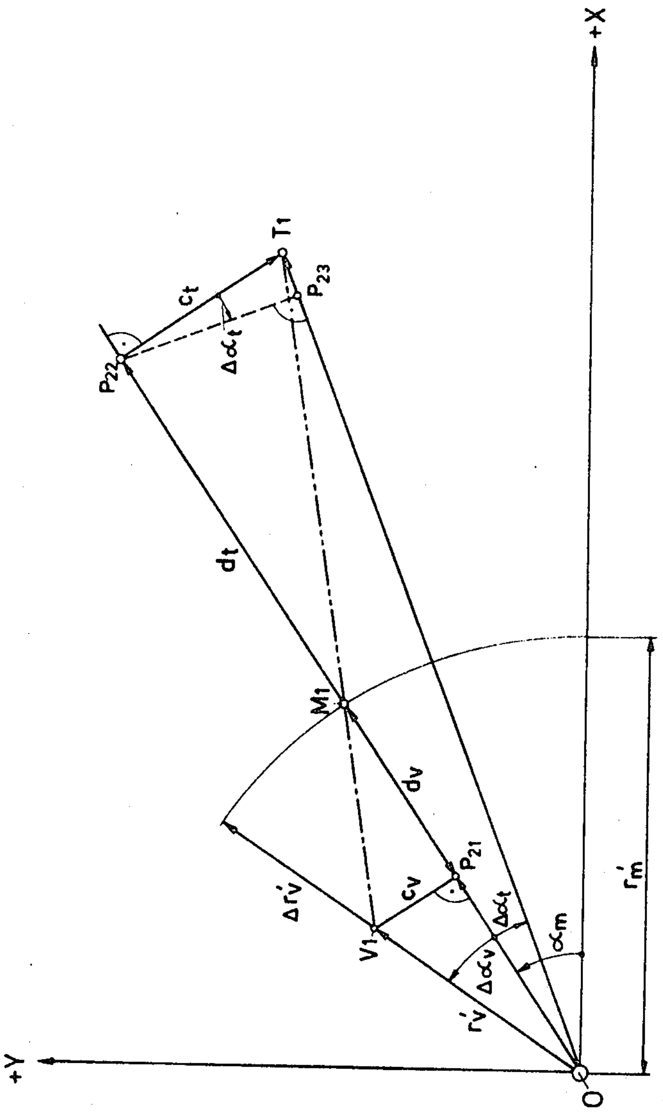
FIG. 9 is a corresponding illustration of the geometric relations as they appear in a horizontal plane through said reference point and through a point which is the vertical projection of the location of the target on the horizontal plane.

In order to better explain the geometrical conditions which prevail in connection with the process of determining the coordinates of a moving target and of the interception point between a missile trajectory and the path of the moving target, reference is had to FIGS. 8 and 9.

In FIG. 8 the geometric relations between certain data are shown as they appear in a vertical plane through a reference point 0 and the location M of a moving target at a given moment. The reference point 0 is not only the location of the observation instrument tracking the target but also the point of origin of a polar coordinate system and of a Cartesian coordinate system having a vertical axis Z and horizontal axes X and Y. Consequently the point $M_1$ is the vertical projection of the momentary target point M onto the horizontal plane H. The diagram shows in said vertical plane the location vector $r_v$ from point 0 to the point V where the moving target was located at the moment $t_0 - \tau$, this vector shown in its true length and at its true elevation angle $\lambda_v$ and as also shown the location vector $r_t$ from point 0 to the interception point T where the moving target is expected to be located after the termination of an extrapolation time period provided that its momentary velocity and direction applying to the position M does not change until then. The vector $R_t$ is also show in its true length and at its true elevation angle $\lambda_t$. However both the first mentioned vector $r_v$ and the other vector $r_t$ are both rotated about the vertical axis Z so that now the above-mentioned points V and T are shown at corresponding points (V) and (T) located in the above-mentioned vertical plane which is the plane of the drawing.

FIG. 9 is the corresponding geometric diagram illustrating the geometric conditions of the respective data as they appear in the horizontal plane H which contains the reference point 0, the axes Y and X and the above-mentioned projection point $M_1$.

It will be understood that it is possible to position at the reference point O a surveying or observation instrument e.g. a conventional radar aiming and tracking apparatus which is constructed and designed to produce continuously the polar coordinates $r_m$, $\lambda_m$, $\alpha_m$ of the momentary location M of a freely moving target e.g. of an airplane and to represent these coordinates by corresponding angular positions or orientations of three output shafts of the apparatus. In addition it is to be assumed that the arrangement diagrammatically illustrated by FIG. 10 which will be described further below contains devices which will make it possible to form continuously difference values $$\Delta r_v = r_m - r_v$$
$$\Delta \lambda_v = \lambda_m - \lambda_v$$
$$\Delta \alpha_v = \alpha_m - \alpha_v$$

wherein the coordinate values $r_v$, $\lambda_v$ and $\alpha_v$ are associated with the above-mentioned point V where the moving target was located at a time preceding by the interval $\tau$ the moment $t_0$ associated with the location M. On the basis of the above at any given moment the following values are known:

$r_m$=true distance OM from 0 to the location of the target at a given moment.

$\Delta r_v$=change of the true distance $r_m$ during the period of time $\tau$ preceding the above-mentioned given moment associated with the location M.

$\lambda_m$=elevation angle above the horizontal plane H and applying to the momentary target location M.

$\Delta\lambda_v$=change of the elevation angle $\lambda_m$ during the above-mentioned time period $\tau$.

$\alpha_m$=azimuth angle relative to the positive X-axis applying to the momentary location M of the target.

$\Delta\alpha_v$=change of the azimuth $\alpha_m$ in the above-mentioned period $\tau$.

From the above definitions the following relations can be derived.

$$\widehat{(V)P_{11}} = a_v = (r_m - \Delta r_v) \sin \Delta\lambda_v \qquad (1)$$

$$\widehat{P_{11}M} = b_v = r_m - (r_m - \Delta r_v) \cos \Delta\lambda_v \qquad (2)$$

$$\widehat{P_{15}M} = \Delta r_v' = a_v \sin \lambda_m + b_v \cos \lambda_m \qquad (3)$$

$$\widehat{OM_1} = r_m' = r_m \cos \lambda_m \qquad (4)$$

$$\widehat{O(V_1)} = r_v' = r_m \cos \lambda_m - \Delta r_v' \qquad (5)$$

For computing the value $\Delta\lambda_t = \lambda_t - \lambda_m$ and $t_t = \widehat{O(T)}$ the triangle $OP_{12}(T)$ of FIG. 8 is used wherein the height $P_{12}P_{13}$ is shown as a dotted line. If linear extrapolation of the interception point T is used then the following equations apply:

$$\widehat{P_{12}(T)} = a_t = a_v \frac{\theta}{\tau} \qquad (6)$$

$$\widehat{MP_{12}} = b_t = b_v \frac{\theta}{\tau} \qquad (7)$$

wherein $\theta$ designates flight time of a missile travelling from point 0 to the interception T provided that the missile is fired at the same moment $t_0$ at which the target is located at the point M. Moreover, in these equations $\tau$ desnates a constant delay time period relative to the given moment $t_0$ whereby the location of the previous target V is indicated. By utilizing the values $a_t$, $b_t$ and $r_m$ a triangle $OP_{12}(T)$ is defined wherein:

$$\widehat{P_{12}P_{13}} = a_t \cos \Delta\lambda_t = (r_m + b_t) \sin \Delta\lambda_t$$

$$a_t \cos \Delta\lambda_t - (r_m + b_t) \sin \Delta\lambda_t = 0 \qquad (8)$$

i.e. an equation is found which defines also the change $\Delta\lambda_t$ of the elevation angle $\lambda_m$ during the duration of the missile flight upon which the extrapolation is based.

By utilizing this differential angular value $\Delta\lambda_t$ it is also to be found from FIG. 8 that $$\widehat{O(T)} = \widehat{OP_{13}} + \widehat{P_{13}(T)} = r_t =$$

true distance from 0 to the interception point $(T)$ $$= rt = a_t \sin \Delta\lambda_t + (r_m + b_t) \text{ cosin } \Delta\lambda_t \qquad (9)$$

From the plan view diagram according to FIG. 9 one can derive, based on the given values $\alpha_m$ and $\Delta\alpha_v$ and on the easily computable values $r_m$, $\Delta r_v$, the following relations:

$$\widehat{V_1P_{21}}=c_v=r_v' \sin \Delta\alpha_v \quad (11)$$

$$\widehat{P_{21}M_1}=d_v=r_m'-r_v' \cos \Delta\alpha_v \quad (12)$$

From these data the following linearly extrapolated values can be derived:

$$\widehat{P_{22}T_1}=c_t=c_v\frac{\theta}{\tau} \quad (13)$$

$$\widehat{M_1P_{22}}=d_td_v\frac{\theta}{\tau} \quad (14)$$

with the aid of which the following definition for the azimuth lead angle $\Delta\alpha_t$ can be derived from the triangle $OP_{22}T_1$ the height of which $P_{22}P_{23}$ is shown in FIG. 9:

$$c_t \cos \Delta\alpha_t-(r_m'+d_t) \sin \Delta\alpha_t=0 \quad (15)$$

i.e. an equation which defines the change angle $\Delta\alpha_t$ of the azimuth angle $\alpha_m$ which takes place during the missile flight time $\theta$ on which the extrapolation is based.

Figure 10:
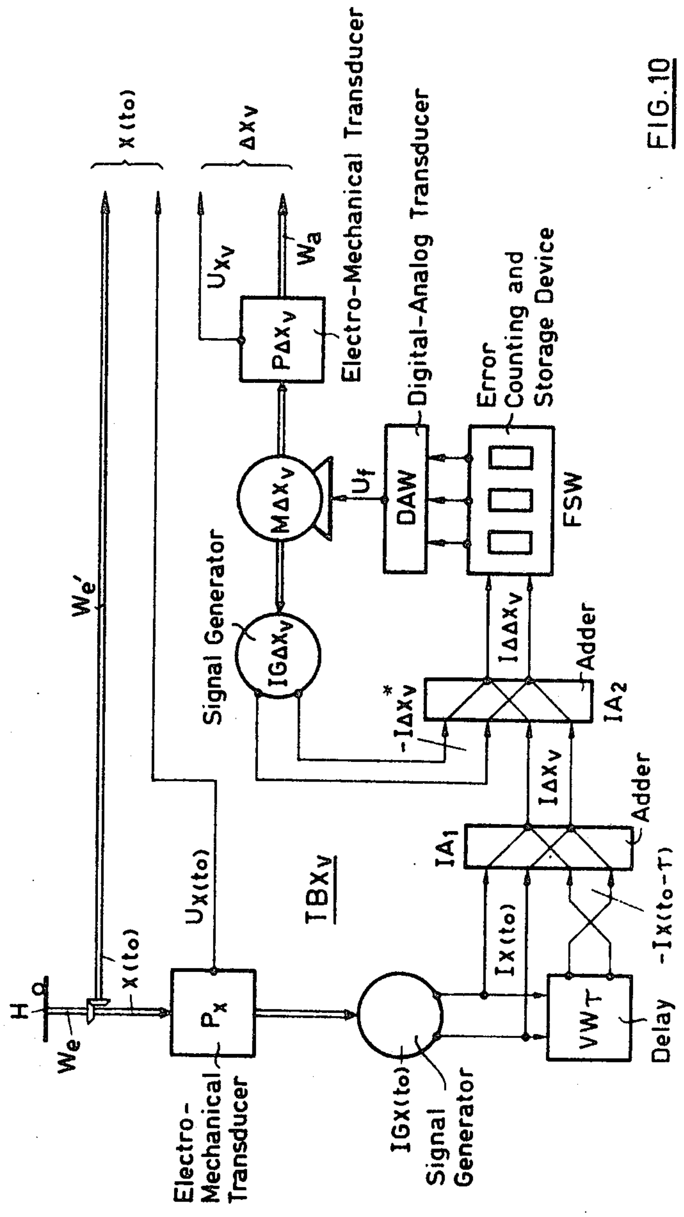
FIG. 10 is a schematic diagram of an apparatus according to the invention for computing the mean velocity of change of an input value $x(t)$ during a certain period of time.

Before starting with a description of the embodiment of a lead point predicter according to the invention as illustrated by FIG. 11 which serves to solve the above equations for the required polar coordinates $$r_t,\ \lambda_m\pm\Delta\lambda_t,\ \alpha_m\pm\Delta\alpha_t$$

of the interception point T, the embodiment according to FIG. 10 will be described which consists in an apparatus for continuously forming a value $\Delta x_v$ corresponding to the mean change velocity $\Delta x/\tau$ of any kind of an input value $x(t)$ freely varying with time during a predetermined constant delay period $\tau$ ending at a given moment to which the particular value $\Delta x_v$ applies. The velocity value former according to FIG. 10 is designated as a whole by the symbol $TBx_v$.

This arrangement comprises an input shaft $We$ which can be set at any time to an angular position relative to a fixed reference position by means of a hand wheel H or by some other setting devices not shown so that the set angular position represents exactly the value $x(t_0)$ at a given moment of an input value $x(t)$ which is freely variable with time. A conventional electro-mechanical proportional transducer $Px$ is provided for being adjusted or controlled by the shaft $We$ and converts the mechanical analog value $x(t)$ into an electrical analog value e.g. into a direct current voltage $Ux(t_0)$ so that at the illustrated outputs $x(t_0)$ not only this electrical analog value but also the mechanical analog value is available, the latter by mechanical transmission through a shaft $We'$.

The input shaft $We$ extends to a 2-phase increment signal generator $IGx(t_0)$ of the described conventional types, as to operate the latter which produces electrical increment signals $Ix(t_0)$ having positive or negative characteristics as the case may be and of which each represents an increment i.e. each change of the input value $x(t_0)$ amounting to a predetermined small constant increment unit and having the correct positive or negative characteristic.

The increment signals $Ix(t_0)$ issued by the generator $IGx(t_0)$ are applied to the one pair of inputs of an increment adder $IA_1$ to be described further below and also to a pair of input terminals of a conventional delay device $VW_\tau$. Delay or storage devices of this type are well known and have the function of temporarily storing the received increment signals $Ix(t_0)$ for a predetermined and constant delay period $\tau$ and of transmitting such stored signals thereafter in otherwise unchanged form. Therefore, the increment signals $Ix(t_0-\tau)$ issued by the delay device $VW_\tau$ at the moment $t_0$ are associated with a moment $t_0-\tau$ preceding the moment $t_0$ by the delay period $\tau$ and they correspond therefore to the input value $x(t_0-\tau)$. These output signals $Ix(t_0-\tau)$ are now reversed from positive to negative or from negative to positive characteristic (which is done by phase inversion) and applied in inverse condition to the second pair of inputs of the above mentioned increment adder $IA_1$. This adder is also of conventional type and designed and constructed for additively combining the increment signals $Ix(t_0)$ and $-Ix(t_0-\tau)$ as they are introduced to its two pairs of inputs and to issue the result via its 2-phase output line so that these output increment signals are $$\Delta x=Ix(t_0)-Ix(t_0-\tau)$$

and correspond to the increments of the input value $x(t)$ which occur during the delay period $\tau$ determined by the storage and delay device $VW_\tau$ with correct negative or positive characteristic. Details of the increment adder device have been described further above.

The output increment signals issued by the increment adder $IA_1$ are now applied to the one pair of inputs of a second similar increment adder $IA^2$ while the other pair of inputs thereof is supplied with increment signals $-I\Delta x_v{}^*$ furnished by a second 2-phase increment signal generator $IG\Delta x_v$. At the output of the second increment adder increment signals will appear which are defined by $$I\Delta\Delta x_v=I\Delta x_v-I\Delta x_x{}^*$$

and are applied to an error storage device FSW of conventional type as mentioned further above wherein these signals are counted or added in conventional manner with correct positive and negative characteristics. At any given moment the storage content of this error storage device FSW corresponds to the time integral of the increments $I\Delta\Delta x$. The content of the device FSW is then applied to a conventional digital-analog transducer DAW for being converted thereby into an analog voltage $U_f$. This voltage is used for driving a servomotor $M\Delta x_v$ which is equipped with an output shaft $W\alpha$ by means of which now the above mentioned increment signal generator $IG\Delta x_v$ is automatically adjusted in such a manner that ultimately by the adjustment of this generator its control voltage $U_f$ is reduced i.e. that by the resulting change of the output of the second increment adder $IA_2$ the storage content of the error storage device FWS is reduced. This means that the shaft $W\alpha$ is automatically set to a position which represents the value $\Delta x_v=x(t_0)-x(t_0-\tau)$ i.e. this shaft follows continuously in its angular position any amount of change of the input value during the above mentioned delay period caused by the delay device $VW_\tau$ and ending at the respective given moment. This output value $\Delta x_v$ and also an electric analog value $U_{xv}$ produced by another conventional proportional transducer $P\Delta x_v$ are both available at the outputs $\Delta x_v$ of the velocity former $TBx_v$ according to FIG. 10 for any desired use thereof.

Referring now to the trigonometric lead point predicter, according to FIG. 11 it can be seen that this arrangement comprises three velocity formers of similar type as described above and designated by $TBr_1$, $TB\lambda_1$ and $TB\alpha_1$ which serve to form the change values $\Delta r_v$, $\Delta\lambda_v$, and $\Delta\alpha_v$ of the input values $r_m$, $\lambda_m$ and $\alpha_m$. The analog computer according to FIG. 11 comprises as a whole three main portions namely the velocity computer $TR_1$, the multiplier $PR_1$, and the actual lead calculator VR. The most important computer elements are conventional Goniometers $Go$ which operate as sine-cosine resolvers of input values and which are known for instance from U.S. Patent 2,919,850 (FIG. 12). There are also conventional positive-negative converters symbolized by a circle with the minus sign within, adding elements symbolized by a circle with a positive sign within and multipliers designed by Q. Moreover there are provided servomotors $M\Delta\lambda_t$, $M\Delta\alpha_t$ and $M_\phi$ which are each associated with corresponding input amplifiers. A conventional non-linear ballistic computer BR which is controlled and adjusted by means of a shaft $W_\phi$ introducing the missile flight time $\theta$ and also by a second shaft $W\lambda_t$ which introduces the elevation angle.

Thus the computer BR furnishes in a conventional manner the true distance $r_t^*$ which corresponds to the other two input values and which is needed for comparison thereof with the true distance $r_t$ defined by Equation 9. Moreover there are conventional integrating gear arrangements $SG\lambda_t$ and $SG\alpha_t$ which are provided for adding rotation angles of two respectively associated input shafts.

On the basis of the above explanations the operation of the three components $TR_1$, $PR_1$, and VR mentioned above will be easily understandable having reference to FIG. 11. The velocity computer $TR_1$ furnishes the components $a_v$, $b_v$, $c_v$ and $d_v$ in accordance with the Equations 1, 2, 11 and 12 which have been formulated above with reference to FIGS. 8 and 9.

The multiplier $PR_1$ serves to extrapolate the change components $a_t$, $b_t$, $c_t$ and $d_t$ in accordance with Equations 6, 7, 13 and 14. The lead calculator VR furnishes the values $\Delta\lambda_t$ (Eq. 8), $\Delta\alpha_t$ (Eq. 15) and the corresponding true distance $r_t$ (Eq. 9). This true distance is then compared with the other true distance $r_t^*$ furnished by the ballistic computer BR by introducing as a control value into the servomotor $M_\theta$ the difference $r_t - r_t^*$ so that this servomotor adjusts the time shaft $W_\theta$ to a position which represents the missile flight time $\theta$ from 0 to the interception point T. The components $a_t$, $b_t$, $c_t$ are linearly extrapolated.

However, in case that for the sake of greater accuracy a square extrapolation of the interception point coordinates is desired instead of the linear extrapolation referred to above and obtainable by the described arrangement, then the following considerations have to take place. The time function $x(t)$, according to which a variable value changes is in this case assumed to be of quadratic nature. This means that $$x(t)=x_0-V_0t+\frac{b}{2}\cdot t^2 \quad (21)$$

The momentary value of this term for $t=t_0=0$ is:

$$x(t_0)=xo \quad (21a)$$

From the above results for a moment $t_0-\tau=-\tau$ preceding by a predetermined delay time:

$$x(-\tau)=x_0-V_0\tau+\frac{b}{2}\tau^2 \quad (22)$$

In a similar manner for a moment $t=t_0-2\tau$:

$$x(-2\tau)=x_0-2V_0\tau+\frac{b}{2}4\tau^2 \quad (23)$$

From the Equations 21*a* and 22 one derives:

$$x(t_0)-x(-\tau)=\Delta x_1=V_0\tau-\frac{b}{2}\tau^2 \quad (24)$$

Similarly from the Equations 21*a* and 23:

$$\frac{x(t_0)-x(-2\tau)}{2}=\frac{\Delta x_2}{2}=V_0\tau-\frac{b}{2}2\tau^2 \quad (25)$$

By combining Equations 24 and 25 one obtains:

$$\Delta x_1-\frac{\Delta x_2}{2}=\Delta\Delta x=\frac{b}{2}\tau^2 \quad (26)$$

By introducing Equation 26 into Equation 24 one obtains:

$$\Delta x_1=V_0\tau-\Delta\Delta x$$

from which results:

$$V_0\tau=\Delta x_1+\Delta\Delta x \quad (27)$$

For obtaining $x(\theta)$ by extrapolation wherein $\theta$ is the extrapolation time, the Equation 21 is converted into $$x(\theta)=x_0+(\Delta x_1+\Delta\Delta x)\frac{\theta}{\tau}+\Delta\Delta x\frac{\theta^2}{\tau^2} \quad (28)$$

The increase or change of the value $x(t)$ during the extrapolation time $\theta$ is therefore:

$$\Delta x(\theta)=(\Delta x_1+\Delta\Delta x)\frac{\theta}{\tau}+\Delta\Delta x\frac{\theta^2}{\tau^2}$$

or:

$$\Delta x(\theta)=\left[\Delta x_1+\Delta\Delta x+\Delta\Delta x\frac{\theta}{\tau}\right]\frac{\theta}{\tau} \quad (29)$$

If now in FIGS. 8 and 9 the above developed extrapolation equations are applied to the components $a_v$, $b_v$, $c_v$ and $d_v$, respectively appearing in FIGS. 8 and 9, then one has to presume that the respective values are computed twice, namely as values $a_{v1}$, $b_{v1}$, $c_{v1}$ and $d_{v1}$ in relation to point $V_1$ and to the delay period $\tau$, and as $a_{v2}$, $b_{v2}$, $c_{v2}$ and $d_{v2}$ in relation to another point $V_2$ defined by a delay time period $2\tau$ of twice the duration of the first mentioned delay period. In other words, two points $V_1$ and $V_2$ are computed where the moving target was located at the moments $t_0-\tau$ and $t_0-2\tau$, respectively, and accordingly the values $a_{v1}$, $b_{v1}$, $c_{v1}$, and $d_{v1}$ for the point $V_1$ and the values $a_{v2}$, $b_{v2}$, $c_{v2}$, and $d_{v2}$ for the other point $V_2$ are computed. Since these values $a_{v1}$, $b_{v1}$, $c_{v1}$, and $d_{v1}$ and $a_{v2}$, $b_{v2}$, $c_{v2}$, and $d_{v2}$ correspond to the difference values $\Delta x_1$ and $\Delta x_2$ according to Equations 24 and 25, it follows that in the Equation 24 the term $x_1$ can be replaced arbitrarily by either one of the values $a_{v2}$, $b_{v2}$, $c_{v2}$, $d_{v2}$. In a similar manner also in the Equation 29 the term $\Delta x(\theta)$ may be replaced arbitrarily by any one of the extrapolated values $a_t$, $b_t$, $c_t$ or $d_t$.

Consequently, for instance in the case of quadratic extrapolation of the interception point T on the basis of the missile flight time the following set of equations can be formulated:

$$\left.\begin{aligned}
a_{t2}&=a_{v1}+\left[\left(a_{v1}-\frac{a_{v2}}{2}\right)+\left(a_{v1}-\frac{a_{v2}}{2}\right)\cdot\frac{\theta}{\tau}\right]\cdot\frac{\theta}{\tau}\\
b_{t2}&=b_{v1}+\left[\left(b_{v1}-\frac{b_{v2}}{2}\right)+\left(b_{v1}-\frac{b_{v2}}{2}\right)\cdot\frac{\theta}{\tau}\right]\cdot\frac{\theta}{\tau}\\
c_{t2}&=c_{v1}+\left[\left(c_{v1}-\frac{c_{v2}}{2}\right)+\left(c_{v1}-\frac{c_{v2}}{2}\right)\cdot\frac{\theta}{\tau}\right]\cdot\frac{\theta}{\tau}\\
d_{t2}&=d_{v1}+\left[\left(d_{v1}-\frac{d_{v2}}{2}\right)+\left(d_{v1}-\frac{d_{v2}}{2}\right)\cdot\frac{\theta}{\tau}\right]\cdot\frac{\theta}{\tau}
\end{aligned}\right\} \quad (30)$$

For the purpose of explanation it may be mentioned at this point that in the preceding Equations 21 et seq. the term $V_0$ has been used and that this term simply represents the change velocity of the respective variable value at a given moment, the actual magnitude of said change velocity being initially an unknown factor.

A square or quadratic extrapolation of the type explained above may be carried out by means of an arrangement according to FIG. 12 which illustrates diagrammatically a trigonometric lead calculator like that illustrated by FIG. 11 and indicated at VR and combined with a multiplier section and with a velocity former section. However, in FIG. 12 the velocity former section comprises to separate velocity formers or velocity computers $TR_1$ and $TR_2$ each of which is supplied with the polar coordinates $r_m$, $\lambda_m$, $\alpha_m$ of the target location M as determined at a given moment by the above mentioned surveying or observation instrument at 0. The computer $TR_1$ computes the components $a_{v1}$, $b_{v1}$, $c_{v1}$, and $d_{v1}$ associated with a location $V_1$, where the target has been at the moment $t_0-\tau$, while the computer $TR_2$ computes the components $a_{v2}$, $b_{v2}$, $c_{v2}$, $d_{v2}$ associated with a point $V_2$ where a target was located at the moment $t_0-2\tau$. In order to obtain these results it is only necessary that the delay devices VW in the computer $TR_2$, namely in the respective velocity formers $TB_r$, $TB_\lambda$, $TB_\alpha$ (see FIGS 10 and 11) apply to the signals a delay twice as long as the delay used in the computer $TR_1$, namely $2\tau$.

It should be understood that the computer $TR_1$ is constructed and operates exactly like the above described computer $TR_1$ in FIG. 11, i.e. it produces on the basis of the input values $r_m$, $\lambda_m$, $\alpha_m$ the difference values $a_{v1}$, $b_{v1}$, $c_{v1}$, $d_{v1}$ by applying only the predetermined constant delay time $\tau$.

The second computer $TR_2$ is also identical with the above described computer $TR_1$ of FIG. 11 with the only exception that the values $a_{v2}$, $b_{v2}$, $c_{v2}$, $d_{v2}$ are computed on the basis of a doubled delay time $2\tau$.

The thus obtained values $a_{v2}$, $b_{v2}$, $c_{v2}$, $d_{v2}$ appearing at the outputs of $TR_2$ are divided in half by the multipliers marked "½" whereafter they are inverted or rendered negative and then added to the values $a_{v1}$, $b_{v1}$, $c_{v1}$, $d_{v1}$ whereby the values $\Delta\Delta a$, $\Delta\Delta b$, $\Delta\Delta c$, $\Delta\Delta d$, respectively, are obtained which, in turn, are added to the values $a_{v1}$, $b_{v1}$, $c_{v1}$, $d_{v1}$, respectively. To the resulting sums are added the products $\Delta\Delta a\ \theta/\tau$, $\Delta\Delta b\ \theta/\tau$, $\Delta\Delta c\ \theta/\tau$, $\Delta\Delta d\ \theta/\tau$ (which are formed in the multiplier section $PR_2$ comprising exactly as in FIG. 11 multipliers marked $\theta/\tau$ which are controlled or adjusted by the time shaft $\theta$) whereby sums of the type $a_{v1}+\Delta\Delta a+\Delta\Delta a\ \theta/\tau$ etc. are formed which are then multiplied with the factor $\theta/\tau$ so that in this manner the values $a_{t2}$, $b_{t2}$, $c_{t2}$, $d_{t2}$ are determined as defined above in Equation 30. This will be understood if one remembers that for instance the term $$\left(a_{v1}-\frac{a_{v2}}{2}\right)$$

is equivalent to $\Delta\Delta a$, and that similarly the terms of similar structure in the other Equations 30 find their counterpart in the above sums obtained at the end of the respective operations.

Hereafter the above values $a_{t2}$, $b_{t2}$, $c_{t2}$, $d_{t2}$ are introduced instead of the simpler values $a_{t1}$ etc. into a lead calculator VR just as it was described in reference to FIG. 11 so that in this calculator now the coordinates $r_t$, $\lambda_t$, $\alpha_t$ of the interception point T are computed which coordinates are, however, based on square or quadratic extrapolation.

It can be seen from the above that a trigonometric lead point predicter according to FIG. 12 furnishes continuously and practically without delay the above-mentioned polar coordinates of the interception point T where a missile fired at the moment $t_0$ aimed at a target will intercept the latter provided that the target was located at the moment $t_0$ at the point M the coordinates of which have been determined by the surveying or observation instrument located at 0 which is the point of origin of said polar coordinates.

It may be added here that many of the conventional computer components mentioned above are described in greater detail in U.S. Patents 2,763,856 and 2,919,850.

It will be understood that each of the elements described above, or two or more together, may also find a useful application in other types of apparatus for computing continuously data based on changes of a steadily variable physical value and of the direction thereof differing from the type described above.

While the invention has been illustrated and described as embodied in an apparatus for computing continuously data based on changes of a steadily variable physical value nd of the direction thereof differing from the types described above.

While the invention has been illustrated and described as embodied in an apparatus for computing continuously data based on changes of a steadily variable physical value and of the direction thereof by means of computation based directly on the polar coordinates of an observed position of the target and on a computed position of the target at a moment preceding the moment of observation a predetermined constant period of time.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for computing continuously on the basis of the polar coordinates $r_m$, $\lambda_m$, $\alpha_m$, defining relative to a given reference point the momentary positions of an object moving along a given path in a given direction and on the basis of the velocity components thereof by extrapolation the polar coordinates of a point located along said path ahead of said object in said direction, in combination, first, second and third input means for introducing continuously the varying polar coordinates $r_m$, $\lambda_m$, $\alpha_m$, respectively; first, second and third increment signal generator means operatively connected with said first, second and third input means, respectively, for receiving said coordinates and being actuated thereby, and each responding to changes of the respective coordinate in one or the other direction by producing at its output increment signals, each of which represents an increment of predetermined fixed magnitude of a change of the respective coordinate and has a directional characteristic which indicates the direction of such increment of change; first, second and third delay means connected with said output of said first, second, and third increment signal generator means, respectively, each of said delay means delivering said increment signals as issued by the respective signal generator means but with reversed directional characteristic and with a predetermined constant delay; first, second and third increment signal adder means having each two inputs, one of said inputs being connected with said output of the respective signal generator means for receiving said increment signals issued thereby, the other input being connected with the respective delay means for receiving the respective increment signals issued thereby with said reversed directional characteristic and with said delay, each of said signal adder means producing by adding the respective signals received at said two inputs thereof secondary increment signals representing at any given moment the difference between the respective directly received increment signals and the respective delayed increment signals; and first, second and third integrating means connected with said first, second and third adder means, respectively, for continuously integrating the respective secondary increment signals and for storing the summation results, each of said integrating means comprising another increment signal adder means having a first and a second input and an output, said first input thereof being connected with the output of the respective one of said first, second and third adder means for receiving said secondary increment signals, and externally actuatable auxiliary increment signal generator means producing depending upon its actuation tertiary increment signals and delivering the latter to said other increment signal adder means of the respective integrating means, servomotor means having a drive shaft for actuating the respective auxiliary increment signal generator means, said other increment signal adder means producing differential increment signals by adding to said secondary increment signals applied thereto the reversed values of said tertiary increment signals applied thereto, and signal counting and storing means connected with said output of the respective other increment signal adder means for storing the sum of said differential increment signals and for causing delivery of a corresponding energizing voltage to the respective servomotor means so as to cause turning of said drive shaft thereof accordingly, said energizing voltage corresponding at any given moment in magnitude and polarity to said sum of said differential signals stored at such moment in the respective signal counting and storing means, so that at any given moment the angular position of the individual drive shafts of said servomotor means in said first, second and third integrating means, respectively, corresponds with great accuracy to, and indicates, a change of said polar coordinates $r_m$, $\lambda_m$, $\alpha_m$, respectively, that has occurred during said predetermined constant delay period preceding such given moment.

2. In a lead point predicter apparatus for computing continuously on the basis of the polar coordinates $r_m$, $\lambda_m$, $\alpha_m$ defining relative to a given reference point the momentary positions of a target moving along a given path in forward direction and on the basis of the velocity components thereof by extrapolation the polar coordinates of an interception point located along said path ahead of said target in said direction, in combination, first, second and third computer means responding individually to continuous introduction of physical values representing said continuously varying polar coordinates $r_m$, $\lambda_m$, $\alpha_m$, respectively, by forming, respectively, continuously varying difference values $$\Delta r_v = r_m - r_v$$
$$\Delta\lambda_v = \lambda_m - \lambda_v$$
$$\Delta\alpha_v = \alpha_m - \alpha_v$$

said difference values representing at any given moment to changes of said polar coordinates respectively, that have occurred during a predetermined constant period of time $\tau$ preceding said moment $t_0$ at which said coordinates have the values $r_m$, $\lambda_m$, $\alpha_m$, respectively, said coordinates having at the start of said period of time $\tau$ the values $r_v$, $\lambda_v$, $\alpha_v$ respectively, defining a preceding position along said path where said target was located at the moment $t_0-\tau$; travel computer means cooperating with said first, second and third computer means for computing from said difference values the horizontal and vertical first rectangular components of the travel of said target carried out during said time period $\tau$; multiplier means cooperating with said travel computer means for computing by linear extrapolation from said first rectangular components the corresponding second rectangular components of the assumed travel of said target along said path from said momentary position thereof at said moment $t_0$ to said point of interception with a missile to be reached after a missile flight time $\theta$; and lead computer means cooperating with said multiplier means for computing on the basis of said second rectangular components and of said missile flight time $\theta$ the lead values applying to the particular path and velocity of said target and to the required missile flight time required for intercepting said target.

3. In a lead point predicter apparatus for computing continuously on the basis of the polar coordinates $r_m$, $\lambda_m$, $\alpha_m$ defining relative to a given reference point the momentary positions of a target moving along a given path in forward direction and on the basis of the velocity components thereof by extrapolation the polar coordinates of an interception point located along said path ahead of said target in said direction, in combination, first, second and third computer means responding individually to continuous introduction of physical values representing said continuously varying polar coordinates $r_m$, $\lambda_m$, $\alpha_m$, respectively, by forming, respectively, continuously varying difference values $$\Delta r_v = r_m - r_v$$
$$\Delta\lambda_v = \lambda_m - \lambda_v$$
$$\Delta\alpha_v = \alpha_m - \alpha_v$$

said difference values representing at any given moment changes of said polar coordinates, respectively, that have occurred during a predetermined constant period of time $\tau$ preceding said moment $t_0$ at which said coordinates have the values $r_m$, $\lambda_m$, $\alpha_m$, respectively, said coordinates having at the start of said period of time $\tau$ the values $r_v$, $\lambda_v$, $\alpha_v$, respectively, defining a preceding position along said path where said target was located at the moment $t_0-\tau$; fourth, fifth and sixth computer means responding individually to continuous introduction of said physical values representing said continuously varying polar coordinates $r_m$, $\lambda_m$, $\alpha_m$, respectively, by forming respectively, continuously varying second difference values $$\Delta r_{v2} = r_m - r_{v2}$$
$$\Delta\lambda_{v2} = \lambda_m - \lambda_{v2}$$
$$\Delta\alpha_{v2} = \alpha_m - \alpha_{v2}$$

said second difference values representing at said given moment changes of said polar coordinates, respectively, that have occurred during a predetermined period of time $2\tau$ preceding said moment $t_0$ at which said coordinates have the value $r_m$, $\lambda_m$, $\alpha_m$, respectively, said coordinates having at the start of said period of time $2\tau$ the values $r_{2v}$, $\lambda_{2v}$, $\alpha_{2v}$, respectively, defining a second point along said path where said target was located at the moment $t_0-2\tau$; first travel computer means cooperating with said first, second and third computer means for computing from said difference values the horizontal and vertical first rectangular components of the travel of said target carried out during said time period; second travel computer means cooperating with said fourth, fifth and sixth computer means for computing from said second difference values the horizontal and vertical second rectangular components of the travel of said target carried out during said time period $2\tau$; multiplier means cooperating with both said travel computer means for computing by quadratic extrapolation from said first and second rectangular components the corresponding third rectangular components of the assumed travel of said target along said path from said momentary position thereof at said moment $t_0$ to said point of interception with a missile to be reached after a missile flight time $\theta$; and lead computer means cooperating with said multipler means for computing on the basis of said third rectangular components and of said missile flight time $\theta$ the lead values applying to the particular path and velocity of said target and to the required missile flight time required for intercepting said target.

4. An apparatus according to claim 2 wherein said travel computer means include computing means for computing continuously said vertical first rectangular components, namely according to equation $$b_v = r_m - (r_m - \Delta r_v) \cos \Delta\lambda_v$$

the component $\delta_v$ extending in the direction of the polar coordinate $r_m$, and according to equation $a_v = (r_m - \Delta r_v) \sin \Delta\lambda_v$ the component $a_v$ extending at right angles to said polar coordinate $r_m$, and for deriving therefrom and from said time period $\tau$ the corresponding components of the velocity vector corresponding to the travel of said target from its position at the moment $t_0-\tau$ to its position at the moment $t_0$.

5. An apparatus according to claim 3 wherein said first travel computer means include computing means for computing continuously said vertical first rectangular components, namely according to equation $$b_v = r_m - (r_m - \Delta r_v) \cos \Delta\lambda_v$$

the component $b_v$ extending in the direction of the polar coordinate $r_m$, and according to equation $a_v = (r_m - \Delta r_v) \sin \Delta\lambda_v$ the component $a_v$ extending at right angles to said polar coordinate $r_m$, and for deriving therefrom and from said time period $\tau$ the corresponding components of the velocity vector corresponding to the travel of said target from its position at the moment $t_0-\tau$ to its position at the moment $t_0$, and wherein said second travel computer means include computing means for computing continuously said vertical second rectangular components, namely according to equation $$b_{v2} = r_m - (r_m - \Delta r_{v2}) \cos \Delta\lambda_{v2}$$

the component $b_{v2}$ extending in the direction of the polar coordinate $r_m$, and according to the equation $$a_{v2} = (r_m - \Delta r_{v2}) \sin \Delta\lambda_{v2}$$

the component $a_{v2}$ extending at right angles to said polar coordinate $r_m$, and for deriving therefrom and from said time period $2\tau$ the corresponding components of a second velocity vector corresponding to the travel of said target from its position at the moment $t_0-2\tau$ to its position at the moment $t_0$.

6. An apparatus according to claim 4 wherein said travel computer means include computing means for continuously computing on the basis of said vertical first components $a_v$ and $b_v$ and of said polar coordinates $\lambda_m$ in accordance with the equation $$\Delta r_v' = a_v \cdot \sin \lambda_m = b_v \cdot \cos \lambda_m$$

the projection $\Delta r_v'$ of said velocity vector onto a horizontal plane through said reference point, and for computing according to the equation $$d_v = r_m \cdot \cos \lambda_m - (r_m \cdot \cos \lambda_m - \Delta r'_v) \cdot \cos \Delta\alpha_v$$

the component $d_v$ of the projection of said velocity vector onto said horizontal plane, said component $d_v$ extending in said plane in direction from said reference point to the perpendicular projection onto said plane of said position of said target at said moment $t_0$, and for computing in accordance with the equation $$c_v = (r_m - \cos \lambda_m - \Delta r_v') \cdot \sin \Delta\alpha_v$$

the component $c_v$ of said projection of said velocity vector, said component $c_v$ extending at right angles to said component $d_v$.

7. An apparatus according to claim 5 wherein said second travel computer means include computing means for continuously computing on the basis of said vertical second components $a_{v2}$ and $b_{v2}$ and of said polar coordinates $\lambda_m$ in accordance with the equation $$\Delta r_{v2}' = a_{v2} \cdot \sin \lambda_m + b_{v2} \cdot \cos \lambda_m$$

the projection $\Delta r_{v2}'$ of said second velocity vector onto a horizontal plane through said reference point, and for computing according to the equation $$d_{v2} = r_m \cdot \cos \lambda_m - (r_m \cdot \cos \lambda_m - \Delta r_{v2}') \cdot \cos \Delta\alpha_{v2}$$

the component $d_{v2}$ of the projection of said second velocity vector onto said horizontal plane, said component $d_{v2}$ extending in said plane in direction from said reference point to the perpendicular projection onto said plane of said position of said target at said moment $t_0$, and for computing in accordance with the equation $$c_{v2} = (r_m \cdot \cos \lambda_m - \Delta r_{v2}') \cdot \sin \Delta\alpha_{v2}$$

the component $c_{v2}$ of said projection of said second velocity vector, said component $c_{v2}$ extending at right angles to said component $d_{v2}$.

8. An apparatus according to claim 6, wherein said lead computer means include computing means for computing the lead angles applying to said interception point on the basis of the simultaneously valid equations $$\Delta\alpha_t = \alpha_t - \alpha_m$$

and $$\Delta\lambda_t = \lambda_t - \lambda_m$$

wherein $\alpha_t$ and $\lambda_t$ are polar coordinates associated with said interception point and extrapolated from $\Delta\alpha_v$ and $\Delta\lambda_v$, respectively, and for computing the straight distance $r_t$ from said reference point to said interception point on the basis of said missile travel time $\theta$ in accordance with the equations:

$$\frac{\theta}{\tau} a_v \cos \Delta\lambda_t - \left(\frac{\theta}{\tau} b_v + r_m\right) \sin \Delta\lambda_t = 0$$

$$\frac{\theta}{\tau} a_v \sin \Delta\lambda_t + \left(\frac{\theta}{\tau} b_v + r_m\right) \cos \Delta\lambda_t = r_t$$

$$\frac{\theta}{\tau} a_v \cos \Delta\alpha_t - \left(\frac{\theta}{\tau} d_v + r_m \cos \lambda_m\right) \sin \Delta\alpha_t = 0$$

9. An apparatus according to claim 7, wherein said lead computer means include computing means for computing by square extrapolation the components of the lead vector and its projection in the azimuth plane on the basis of the equations:

$$a_{t2} = \left[a_{v1} + \left(a_{v1} - \frac{a_{v2}}{2}\right)\right] \frac{\theta}{\tau} + \left(a_{v1} - \frac{a_{v2}}{2}\right) \frac{\theta^2}{\tau^2}$$

$$b_{t2} = \left[b_{v1} + \left(b_{v1} - \frac{b_{v2}}{2}\right)\right] \frac{\theta}{\tau} + \left(b_{v1} - \frac{b_{v2}}{2}\right) \frac{\theta^2}{\tau^2}$$

$$c_{t2} = \left[c_{v1} + \left(c_{v1} - \frac{c_{v2}}{2}\right)\right] \frac{\theta}{\tau} + \left(c_{v1} - \frac{c_{v2}}{2}\right) \frac{\theta^2}{\tau^2}$$

$$d_{t2} = \left[d_{v1} + \left(d_{v1} - \frac{d_{v2}}{2}\right)\right] \frac{\theta}{\tau} + \left(d_{v1} - \frac{d_{v2}}{2}\right) \frac{\theta^2}{\tau^2}$$

and further computer means for computing the lead data $\Delta\lambda_t$, $\Delta\alpha_t$ and $r_t$ applying to said interception point on the basis of the simultaneously valid equations:

$$a_{t2} \cos \Delta\lambda_t - (b_{t2} + r_m) \sin \Delta\lambda_t = 0$$
$$a_{t2} \sin \Delta\lambda_t + (b_{t2} + r_m) \cos \Delta\lambda_t = r_t$$
$$c_{t2} \cos \Delta\alpha_t - (d_{t2} + r_m \cos \Delta\lambda_t) \sin \Delta\alpha_t - 0$$

wherein $a_{t2}$, $b_{t2}$, $c_{t2}$ and $d_{t2}$ are the rectangular components of the travel of the target from its position at the moment $_{t0}$ to said interception point, while $a_{v1}$, $b_{v1}m$, $c_{v1}$, $d_{v1}$ are the rectangular components of the travel of the target during said time period $\tau$ and $a_{v2}$, $b_{v2}$, $c_{v2}$, $d_{v2}$ are the corresponding coordinates for the period $2\tau$, wherein $\Delta\alpha_t$ and $\Delta\lambda_t$ are the lead angles defined by $$\Delta\alpha_t = \alpha_t - \alpha_m$$

and $$\Delta\lambda_t = \lambda_t - \lambda_m$$

wherein $\alpha_t$ and $\lambda_t$ are polar coordinates associated with said interception point and $r_t$ is the straight distance from said reference point to said interception point.

10. Arrangement for the generation of a velocity signal, corresponding both in magnitude and direction to the rate of change of a continuously variable physical value, comprising in combination, input means for furnishing said continuously variable physical value; increment signal generator means operatively connected to said input means for generating two phase binary increment signals, each change of signal combinations in said two phases corresponding to a predetermined increment change in said physical value, the sequence of said changes corresponding to the direction of said increment change of said physical value; delay means for receiving said increment signals and furnishing delayed increment signals having a predetermined constant delay and reversed directional characteristic relative to said increment signals; increment signal adder means, direct current coupled throughout, having a first input for receiving said increment signals and a second input for receiving said delayed increment signals, for furnishing secondary increment signals representing at any moment the difference between said increment signals and said delayed increment signals; and integrating means connected to said adder means for continuously algebraically summing up said secondary increment signals consecutively and storing the summation result, whereby at any given moment the stored result divided by the duration of said predetermined constant delay corresponds to the magnitude and direction of the rate of change of said physical value during the constant predetermined delay period preceding said moment.

11. An arrangement as set forth in claim 10 wherein said integrating means comprise counting means having direct current coupling throughout.

12. An arrangement as set forth in claim 10 wherein said integrating means comprise servomotor means having a drive shaft; second increment signal generator means actuated by said drive shaft for producing tertiary increment signals in dependence upon said actuation; second increment signal adder means having a first input for receiving said secondary increment signals, a second input for receiving said tertiary increment signals with reversed direction, and a second adder output for furnishing differential increment signals corresponding to the sum of the signals at said first and second inputs; signal counting and storing means connected to said output of said second increment signal adder means for storing the sum of said differential signals; and means for generating an energizing voltage for said servo motor in correspondence to the value stored in said signal counting and storing means, whereby at any given moment the angular position of the drive shaft of said servo motor substantially corresponds to, and indicates, the magnitude and direction of change of said physical value that has occurred during said predetermined constant delay period preceding said given moment.

References Cited

UNITED STATES PATENTS

| | | | |
|---|---|---|---|
| 3,021,062 | 2/1962 | Steele | 235—150.31 XR |
| 3,064,169 | 11/1962 | Mynall | 318—28 |

MARTIN B. HARTMAN, Primary Examiner

U.S. Cl. X.R.

235—61.5, 151; 318—20; 343—7.4